(12) United States Patent
Liao et al.

(10) Patent No.: US 10,727,544 B2
(45) Date of Patent: Jul. 28, 2020

(54) UNINTERRUPTIBLE POWER SUPPLY AND BATTERY ACTIVATION OPERATION METHOD THEREOF

(71) Applicant: CYBER POWER SYSTEMS, INC., Taipei (TW)

(72) Inventors: Chun-Chao Liao, Taipei (TW); Chao-Ching Yang, Taipei (TW); Shao-Hsien Cheng, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 110 days.

(21) Appl. No.: 15/970,052

(22) Filed: May 3, 2018

(65) Prior Publication Data
US 2019/0280346 A1    Sep. 12, 2019

(30) Foreign Application Priority Data
Mar. 6, 2018   (CN) .......................... 2018 1 0181791

(51) Int. Cl.
*H02J 9/06* (2006.01)
*H01M 10/44* (2006.01)

(52) U.S. Cl.
CPC .............. *H01M 10/44* (2013.01); *H02J 9/062* (2013.01)

(58) Field of Classification Search
CPC .. H02J 7/022; H02J 7/0042; H02J 9/06; H02J 9/062; H01M 10/44

USPC ................ 320/111, 113, 122, 128, 140, 163; 307/66

See application file for complete search history.

(56) References Cited

U.S. PATENT DOCUMENTS

| 2008/0252144 | A1* | 10/2008 | Wang  | H02J 9/062 |
|---|---|---|---|---|
|  |  |  |  | 307/66 |
| 2014/0183958 | A1* | 7/2014 | Yeh | H02J 9/062 |
|  |  |  |  | 307/66 |
| 2016/0285267 | A1* | 9/2016 | Stone | H02J 3/32 |

* cited by examiner

*Primary Examiner* — Edward Tso
*Assistant Examiner* — Aaron Piggush
(74) *Attorney, Agent, or Firm* — Bacon & Thomas, PLLC

(57) ABSTRACT

An uninterruptible power supply comprising a first switch unit, a charging circuit, a first voltage conversion circuit, a second voltage conversion circuit, a second switch unit and a control circuit is provided. When the uninterruptible power supply performs a battery activation operation, the control circuit controls the first switch unit to provide the AC power received by the uninterruptible power supply to a terminal of a bypass path, controls the first switch unit to provide the output of a battery to the first voltage conversion circuit, controls the second switch unit to electrically couple the output terminal of the uninterruptible power supply to the other terminal of the bypass path, controls the charging circuit to stop charging the battery, and controls the first voltage conversion circuit to perform a DC-DC conversion operation. In addition, a corresponding battery activation operation method is also provided.

37 Claims, 3 Drawing Sheets

UNINTERRUPTIBLE POWER SUPPLY AND BATTERY ACTIVATION OPERATION METHOD THEREOF

BACKGROUND OF THE INVENTION

Field of the Invention

The present invention relates to the technical field of power supply, and more particularly, to an uninterruptible power supply and a battery activation operation method thereof.

Description of Related Art

An uninterruptible power supply (UPS) is used to provide backup power to devices (e.g., computers, servers, or medical equipment) when AC mains fails, so that the devices can still in normal operation in this case.

However, when the battery in the uninterruptible power supply is deteriorating due to aging, the uninterruptible power supply cannot provide stable and reliable backup power. As a result, the back-end devices may be affected and may not operate normally. Therefore, how to solve the problem of battery aging in the uninterruptible power supply has become an important issue.

SUMMARY OF THE INVENTION

An object of the present invention is to provide an uninterruptible power supply, which can perform a battery activation operation.

Another object of the present invention is to provide a battery activation operation method for an uninterruptible power supply.

To achieve the above object, the present invention provides an uninterruptible power supply, which comprises a first switch unit, a charging circuit, a first voltage conversion circuit, a second voltage conversion circuit, a second switch unit, and a control circuit. The first switch unit is electrically coupled to an AC power source, a battery, and a terminal of a bypass path. The charging circuit is electrically coupled to the AC power source and the battery. The first voltage conversion circuit is electrically coupled to the first switch unit. The second voltage conversion circuit is electrically coupled to the first voltage conversion circuit. The second switch unit is electrically coupled to the second voltage conversion circuit and the other terminal of the bypass path. The control circuit is electrically coupled to the first switch unit, the second switch unit, the charging circuit, and the first voltage conversion circuit. When the uninterruptible power supply performs a battery activation operation, the control circuit controls the first switch unit to provide the received AC power to the bypass path, controls the first switch unit to provide an output of the battery to the first voltage conversion circuit, controls the second switch unit to electrically couple an output terminal of the uninterruptible power supply to the other terminal of the bypass path, controls the charging circuit to stop charging the battery, and controls the first voltage conversion circuit to perform a DC-DC conversion operation.

To achieve the above object, the present invention also provides a battery activation operation method for an uninterruptible power supply, which comprises the following steps: enabling the uninterruptible power supply to provide the received AC power to a terminal of a bypass path of the uninterruptible power supply, and to electrically couple its output terminal to the other terminal of the bypass path; enabling the uninterruptible power supply to control a charging circuit of the uninterruptible power supply to stop charging a battery; enabling the uninterruptible power supply to provide the output of the battery to a first voltage conversion circuit of the uninterruptible power supply; and enabling the uninterruptible power supply to control the first voltage conversion circuit to perform a DC-DC conversion operation.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
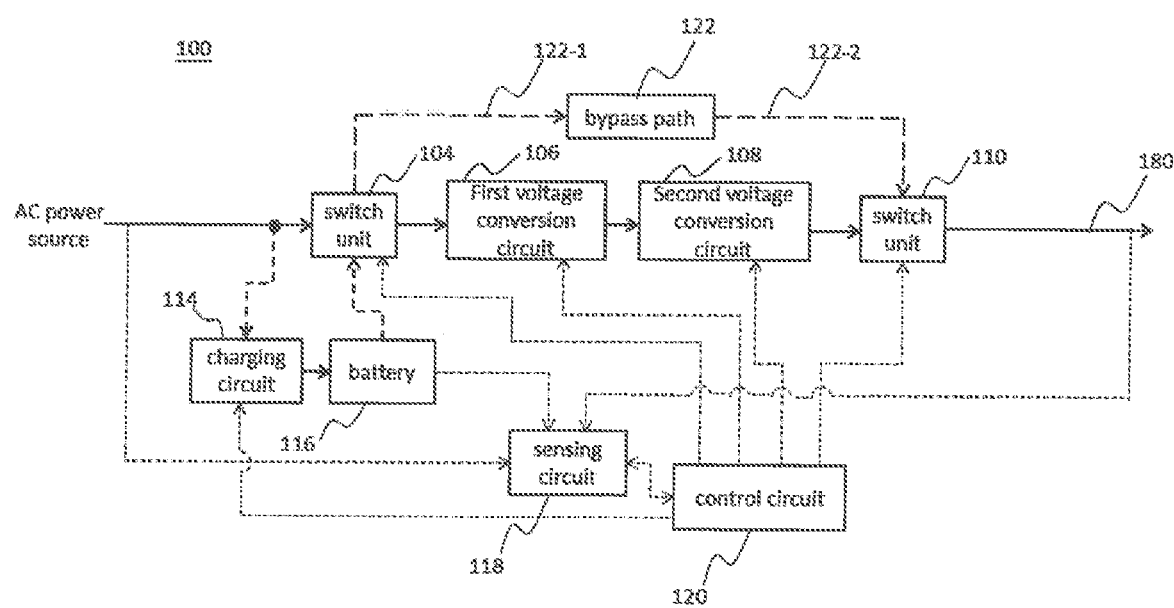
FIG. 1 shows an uninterruptible power supply according to an embodiment of the present invention.

FIG. 1 shows an uninterruptible power supply according to an embodiment of the present invention. As shown in FIG. 1, the uninterruptible power supply 100 comprises a switch unit 104, a first voltage conversion circuit 106, a second voltage conversion circuit 108, a switch unit 110, a charging circuit 114, a battery 116, a sensing circuit 118, a control circuit 120, and a bypass path 122. The switch unit 104 is electrically coupled to an AC power source, a battery 116, and a terminal 122-1 of the bypass path 122. The charging circuit 114 is electrically coupled to the AC power source and the battery 116, and is configured for charging the battery 116. An input terminal of the first voltage conversion circuit 106 is electrically coupled to the switch unit 104. An input terminal of the second voltage conversion circuit 108 is electrically coupled to an output terminal of the first voltage conversion circuit 106. The switch unit 110 is electrically coupled to an output terminal of the second voltage conversion circuit 108, the other terminal 122-2 of the bypass path 122, and an output terminal 180 of the uninterruptible power supply 100. The output terminal 180 of the uninterruptible power supply 100 is used to electrically couple a back-end device (not shown). The sensing circuit 118 is electrically coupled to the AC power source, the battery 116, and the output terminal 180 of the uninterruptible power supply 100. As to the control circuit 120, it is electrically coupled to the switch unit 104, the first voltage conversion circuit 106, the second voltage conversion circuit 108, the switch unit 110, the charging circuit 114, and the sensing circuit 118.

In this embodiment, the first voltage conversion circuit 106 can be implemented by a power factor correction circuit. The power factor correction circuit can perform a DC-DC conversion operation and an AC-DC conversion operation. In addition, the second voltage conversion circuit 108 can be implemented by a DC-AC conversion circuit. The DC-AC conversion circuit can perform a DC-AC conversion operation.

Figure 2:
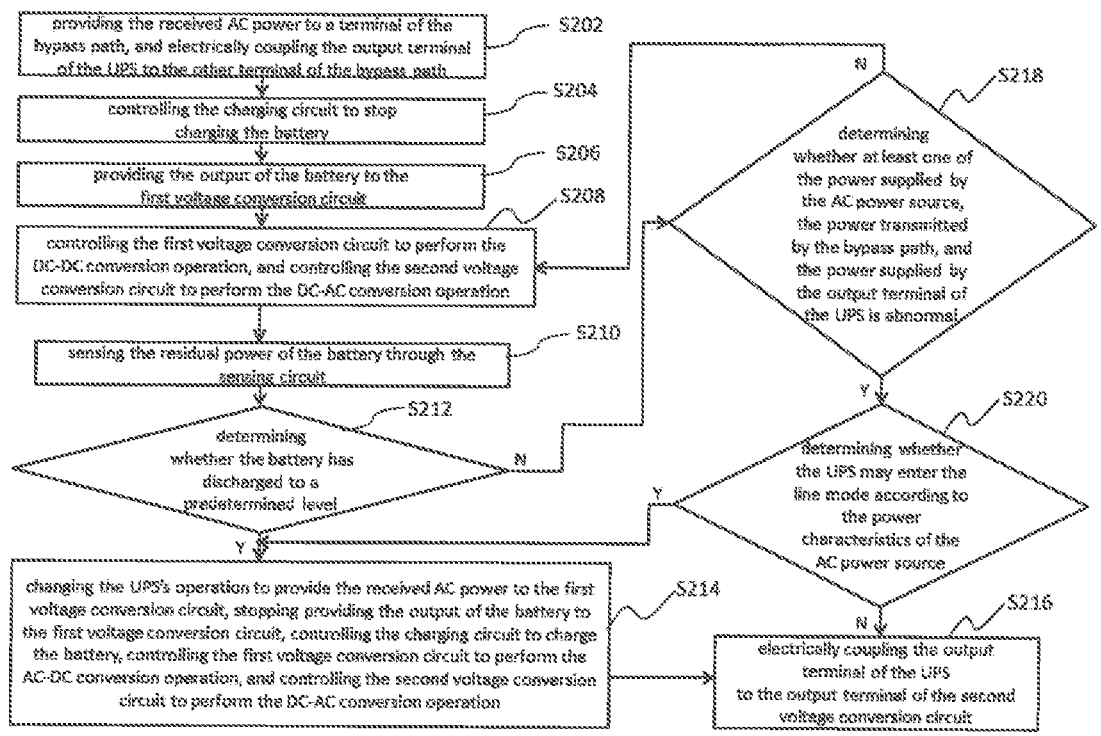
FIG. 2 illustrates a flowchart of a battery activation operation method according to an embodiment of the present invention.

FIG. 2 illustrates a flowchart of a battery activation operation method according to an embodiment of the present invention. Referring to FIGS. 1 and 2, when the uninterruptible power supply 100 performs a battery activation operation, the control circuit 120 controls the switch unit 104 to provide the received AC power to the terminal 122-1 of the bypass path 122, and controls the switch unit 110 to electrically couple the output terminal 180 of the uninterruptible power supply 100 to the other terminal 122-2 of the bypass path 122 (as shown in step S202), so as to provide the received AC power to the back-end device through the bypass path 122. Therefore, the back-end device can operate normally. At the same time, the control circuit 120 controls the charging circuit 114 to stop charging the battery 116 (as shown in step S204), and controls the switch unit 104 to provide the output of the battery 116 to the input terminal of the first voltage conversion circuit 106 (as shown in step S206). In addition, the control circuit 120 controls the first voltage conversion circuit 106 to perform the DC-DC conversion operation, and controls the second voltage conversion circuit 108 to perform the DC-AC conversion operation (as shown in step S208), so that the first the voltage conversion circuit 106 and the second voltage conversion circuit 108 form a light load. Thus, the battery 116 can discharge through the light load.

Certainly, based on different design requirements, the control circuit 120 can control the first voltage conversion circuit 106 to perform the DC-DC conversion operation, and disable the second voltage conversion circuit 108, so that only the first voltage conversion circuit 106 will form a light load.

During the battery activation operation, the control circuit 120 further senses the residual power of the battery 116 through the sensing circuit 118 (as shown in step S210), and determines whether the battery 116 has discharged to a predetermined level accordingly (as shown in step S212). For example, the control circuit 120 can determine whether the battery 116 has fully discharged according to the sensed residual power. When the determination is yes, it indicates that the battery 116 is deeply discharged. This means that the battery 116 has been activated. Thus, the capacity of the battery 116 is picked up, or even recovered to the original level. At this time, the control circuit 120 controls the switch unit 104 to switch to provide the received AC power to the input terminal of the first voltage conversion circuit 106, controls the switch unit 104 to stop providing the output of the battery 116 to the input terminal of the first voltage conversion circuit 106, controls the charging circuit 114 to charge the battery 116, controls the first voltage conversion circuit 106 to perform the AC-DC conversion operation, and controls the second voltage conversion circuit 108 to perform the DC-AC conversion operation (as shown in step S214). In addition, the control circuit 120 controls the switch unit 110 to switch to electrically couple the output terminal 180 of the uninterruptible power supply 100 to the output terminal of the second voltage conversion circuit 108 (as shown in step S216). Thus, the uninterruptible power supply 100 operates in a line mode.

On the other hand, in step S212, when the control circuit 120 determines that the battery 116 has not discharged to the predetermined level, the control circuit 120 further senses, by the sensing circuit 118, at least one of the power supplied by the AC power source and the power supplied by the output terminal 180 of the uninterruptible power supply 100, so as to determine whether there is abnormal power. In other words, during the battery activation operation, the control circuit 120 monitors the said power at any time, so as to determine whether the power supplied to the back-end device is abnormal. This ensures that the back-end device will not be damaged by abnormal power.

Certainly, the sensing circuit 118 can be electrically coupled to the AC power source only, or electrically coupled to the output terminal 180 of the uninterruptible power supply 100 only, or electrically coupled to the bypass path 122 only, or electrically coupled to at least two of the AC power source, the output terminal 180 of the uninterruptible power supply 100, and the bypass path 122. Thus, the control circuit 120 can sense, by the sensing circuit 118 at any time during the battery activation operation, at least one of the power supplied by the AC power source, the power transmitted by the bypass path 122, and the power supplied by the output terminal 180 of the uninterruptible power supply 100 to determine whether there is abnormal power.

In step S218, when the control circuit 120 determines that there is no abnormal power, the control circuit 120 returns to step S208. On the other hand, when the control circuit 120 determines that there is abnormal power, the control circuit 120 further determines whether the uninterrupted power system 100 may enter the line mode according to the power characteristics of the AC power source (as shown in step S220). The said power characteristics comprise at least one of a voltage range and a frequency range. In other words, the control circuit 120 determines whether the uninterruptible power supply 100 may enter the line mode according to at least one of the voltage range and the frequency range of the AC power source.

In step S220, when the control circuit 120 determines that the uninterruptible power supply 100 may enter the line mode, the control circuit 120 performs the operations described in steps S214 and S216, so as to make the uninterruptible power supply 100 operate in the line mode. On the other hand, when the control circuit 120 determines that the uninterruptible power supply 100 may not enter the line mode, the control circuit 120 controls the switch unit 110 to switch to electrically couple the output terminal 180 of the uninterruptible power supply 100 to the output terminal of the second voltage conversion circuit 108 (As shown in step S216), so that the uninterruptible power supply 100 may enter a battery mode and can continue supplying power to the back-end device.

Although all steps in FIG. 2 are executed in a predetermined order, this is not intended to limit the present invention. For example, the execution order of steps S202 and S204 can be reversed, or even executed simultaneously. In addition, the control circuit 120 can further determine whether the uninterruptible power supply 100 should perform the battery activation operation based on at least one of the following conditions: whether the battery 116 has been used for a predetermined period of time (e.g., has been used for 2 years), whether the number of discharges of the battery 116 has reached a predetermined number (e.g., has been discharged for 500 times), whether the discharge time of the battery 116 has decreased by a predetermined ratio (e.g., has decreased by 30%).

Figure 3:
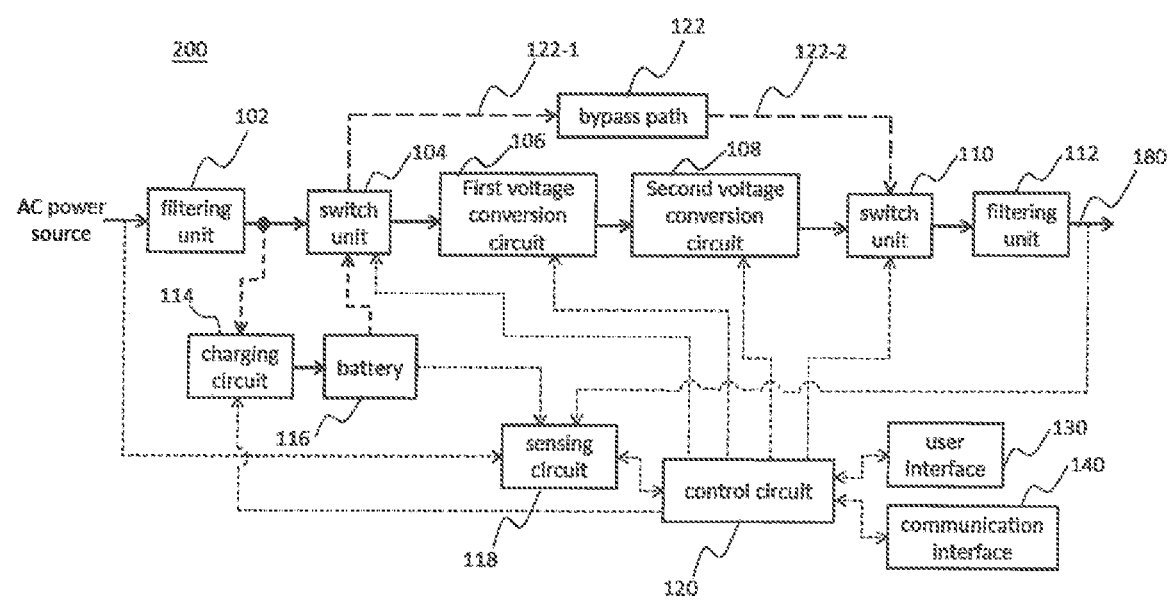
FIG. 3 shows an uninterruptible power supply according to another embodiment of the present invention.

FIG. 3 shows an uninterruptible power supply according to another embodiment of the present invention. Referring to FIGS. 3 and 1, compared with the uninterruptible power supply 100 shown in FIG. 1, the uninterruptible power supply 200 shown in FIG. 3 further comprises a filtering unit 102, a filtering unit 112, a user interface 130 and a communication interface 140. As shown in FIG. 3, both of the switching unit 104 and the charging circuit 114 are electrically coupled to the AC power source through the filtering unit 102, and the switching unit 110 is electrically coupled to the output terminal 180 of the uninterruptible power supply 200 through the filtering unit 112. In addition, the control circuit 120 is also electrically coupled to the user interface 130 and the communication interface 140. The user interface 130 may comprise at least one of an input interface and a display interface. If the user interface 130 has an input interface, the user interface 130 allows a user to manipulate the input interface to enable the user interface 130 to generate a trigger signal for the battery activation operation, thereby enabling the control circuit 120 to force the battery activation operation. Certainly, the control circuit 120 may receive a trigger signal for the battery activation operation through the communication interface 140 to force the battery activation operation.

From the above teachings, those skilled in the art should know that the control circuit 120 in FIG. 3 may determine whether the uninterruptible power supply 200 should perform the battery activation operation according to at least one of the following conditions: whether the battery 116 has been used for a predetermined period of time, whether the number of discharges of the battery 116 has reached a predetermined number, whether the discharge time of the battery 116 has decreased by a predetermined ratio, and whether a trigger signal for the battery activation operation has been received. In addition, although the uninterruptible power supply 200 additionally adopts the filtering unit 102, the filtering unit 112, the user interface 130 and the communication interface 140, it can be determined whether to adopt any one of the four components in an uninterruptible power supply according to actual design requirements.

It should be noted that, in general, both of the battery 116 and the bypass path 122 are disposed inside the case (not shown) of the uninterruptible power supply. However, this is not intended to limit the present invention. Those skilled in the art should know that the battery 116 and the bypass path 122 may also be disposed outside the case of the uninterruptible power supply. In addition, in the foregoing embodiments the first voltage conversion circuit 106 is implemented by a power factor correction circuit. However, this is also not intended to limit the present invention. For example, the first voltage conversion circuit 106 can be implemented by a power factor correction circuit and a DC-DC conversion circuit. The power factor correction circuit is configured to perform the AC-DC conversion operation, and the DC-DC converter circuit is configured to perform the DC-DC conversion operation.

In summary, since the uninterruptible power supply of the present invention can perform the aforementioned battery activation operation, it can deeply discharge the aged battery to activate the battery. In addition, since the uninterruptible power supply of the present invention can provide the received AC power to the back-end device through the bypass path during the battery activation operation, the power needed by the back-end device will not be affected. In other words, the uninterruptible power supply of the present invention can perform a battery activation operation without removing any back-end device.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An uninterruptible power supply, comprising:
    a first switch unit, electrically coupled to an AC power source, a battery and a terminal of a bypass path;
    a charging circuit, electrically coupled to the AC power source and the battery;
    a first voltage conversion circuit, electrically coupled to the first switch unit;
    a second voltage conversion circuit, electrically coupled to the first voltage conversion circuit;
    a second switch unit, electrically coupled to the second voltage conversion circuit and the other terminal of the bypass path; and
    a control circuit, electrically coupled to the first switch unit, the second switch unit, the charging circuit, and the first voltage conversion circuit, wherein when the uninterruptible power supply performs a battery activation operation, the control circuit controls the first switch unit to provide a received AC power to the bypass path, controls the first switch unit to provide an output of the battery to the first voltage conversion circuit, controls the second switch unit to electrically couple an output terminal of the uninterruptible power supply to the other terminal of the bypass path, controls the charging circuit to stop charging the battery, and controls the first voltage conversion circuit to perform a DC-DC conversion operation.

2. The uninterruptible power supply of claim 1, further comprising a sensing circuit, wherein the control circuit is further configured to sense the residual power of the battery through the sensing circuit, and to determine whether the battery has discharged to a predetermined level accordingly.

3. The uninterruptible power supply of claim 2, wherein when the determination result is yes, the control circuit controls the first switch unit to switch to provide the received AC power to the first voltage conversion circuit, controls the first switch unit to stop providing the output of the battery to the first voltage conversion circuit, controls the second switch unit to switch to electrically couple the output terminal of the uninterruptible power supply to an output terminal of the second voltage conversion circuit, controls the charging circuit to charge the battery, controls the first voltage conversion circuit to perform an AC-DC conversion operation, and controls the second voltage conversion circuit to perform a DC-AC conversion operation.

4. The uninterruptible power supply of claim 2, wherein the sensing circuit is further electrically coupled to at least one of the AC power source, the bypass path and the output terminal of the uninterruptible power supply, and when the control circuit determines that the battery has not discharged to the predetermined level, the control circuit further senses, by the sensing circuit, at least one of the power supplied by the AC power source, the power transmitted by the bypass path, and the power supplied by the output terminal of the uninterruptible power supply, so as to determine whether there is abnormal power.

5. The uninterruptible power supply of claim 4, wherein when the control circuit determines that there is abnormal power, the control circuit further determines whether the uninterrupted power system may enter a line mode according to the power characteristics of the AC power source.

6. The uninterruptible power supply of claim 5, wherein when the control circuit determines that the uninterruptible power supply may enter the line mode, the control circuit controls the first switch unit to switch to provide the received AC power to the first voltage conversion circuit, controls the first switch unit to stop providing the output of the battery to the first voltage conversion circuit, controls the second switch unit to switch to electrically couple the output terminal of the uninterruptible power supply to an output terminal of the second voltage conversion circuit, controls the charging circuit to charge the battery, controls the first voltage conversion circuit to perform an AC-DC conversion operation, and controls the second voltage conversion circuit to perform a DC-AC conversion operation.

7. The uninterruptible power supply of claim 5, wherein when the control circuit determines that the uninterruptible power supply may not enter the line mode, the control circuit controls the second switch unit to switch to electrically couple the output terminal of the uninterruptible power supply to an output terminal of the second voltage conversion circuit.

8. The uninterruptible power supply of claim 5, wherein the power characteristics of the AC power source comprise at least one of a voltage range and a frequency range.

9. The uninterruptible power supply of claim 1, wherein when the uninterruptible power supply performs the battery activation operation, the control circuit further controls the second voltage conversion circuit to perform a DC-AC conversion operation.

10. The uninterruptible power supply of claim 9, further comprising a sensing circuit, wherein the control circuit is further configured to sense the residual power of the battery through the sensing circuit, and to determine whether the battery has discharged to a predetermined level accordingly.

11. The uninterruptible power supply of claim 10, wherein when the determination result is yes, the control circuit controls the first switch unit to switch to provide the received AC power to the first voltage conversion circuit, controls the first switch unit to stop providing the output of the battery to the first voltage conversion circuit, controls the second switch unit to switch to electrically couple the output terminal of the uninterruptible power supply to an output terminal of the second voltage conversion circuit, controls the charging circuit to charge the battery, controls the first voltage conversion circuit to perform an AC-DC conversion operation, and controls the second voltage conversion circuit to perform the DC-AC conversion operation.

12. The uninterruptible power supply of claim 10, wherein the sensing circuit is further electrically coupled to at least one of the AC power source, the bypass path and the output terminal of the uninterruptible power supply, and when the control circuit determines that the battery has not discharged to the predetermined level, the control circuit further senses, by the sensing circuit, at least one of the power supplied by the AC power source, the power transmitted by the bypass path, and the power supplied by the output terminal of the uninterruptible power supply, so as to determine whether there is abnormal power.

13. The uninterruptible power supply of claim 12, wherein when the control circuit determines that there is abnormal power, the control circuit further determines whether the uninterrupted power system may enter a line mode according to the power characteristics of the AC power source.

14. The uninterruptible power supply of claim 13, wherein when the control circuit determines that the uninterruptible power supply may enter the line mode, the control circuit controls the first switch unit to switch to provide the received AC power to the first voltage conversion circuit, controls the first switch unit to stop providing the output of the battery to the first voltage conversion circuit, controls the second switch unit to switch to electrically couple the output terminal of the uninterruptible power supply to an output terminal of the second voltage conversion circuit, controls the charging circuit to charge the battery, controls the first voltage conversion circuit to perform an AC-DC conversion operation, and controls the second voltage conversion circuit to perform the DC-AC conversion operation.

15. The uninterruptible power supply of claim 13, wherein when the control circuit determines that the uninterruptible power supply may not enter the line mode, the control circuit controls the second switch unit to switch to electrically couple the output terminal of the uninterruptible power supply to an output terminal of the second voltage conversion circuit.

16. The uninterruptible power supply of claim 13, wherein the power characteristics of the AC power source comprise at least one of a voltage range and a frequency range.

17. The uninterruptible power supply of claim 1, wherein the control circuit further determines whether the uninterruptible power supply should perform the battery activation operation based on at least one of the following conditions: whether the battery has been used for a predetermined period of time, whether the number of discharges of the battery has reached a predetermined number, whether the discharge time of the battery has decreased by a predetermined ratio, and whether a trigger signal for the battery activation operation has been received.

18. The uninterruptible power supply of claim 1, wherein the first voltage conversion circuit comprises a power factor correction circuit.

19. The uninterruptible power supply of claim 1, wherein the first voltage conversion circuit comprises a power factor correction circuit and a DC-DC conversion circuit.

20. The uninterruptible power supply of claim 1, wherein the second voltage conversion circuit comprises a DC-AC conversion circuit.

21. A battery activation operation method of an uninterruptible power supply, comprising the steps of, when the uninterruptible power supply performs a battery activation operation:
having the uninterruptible power supply provide a received AC power to a terminal of a bypass path of the uninterruptible power supply, and electrically couple an output terminal of the uninterruptible power supply to the other terminal of the bypass path;

having the uninterruptible power supply control a charging circuit of the uninterruptible power supply to stop charging a battery;

having the uninterruptible power supply provide the output of the battery to a first voltage conversion circuit of the uninterruptible power supply; and having the uninterruptible power supply control the first voltage conversion circuit to perform a DC-DC conversion operation.

22. The battery activation operation method of claim 21, further comprising:

having the uninterruptible power supply sense the residual power of the battery through a sensing circuit, and accordingly determine whether the battery has discharged to a predetermined level.

23. The battery activation operation method of claim 22, further comprising:

having the uninterruptible power supply perform the following operations when the determination result is yes: changing the operation of the uninterruptible power supply to provide the received AC power to the first voltage conversion circuit, stopping providing the output of the battery to the first voltage conversion circuit, changing the operation of the uninterruptible power supply to electrically couple the output terminal of the uninterruptible power supply to an output terminal of a second voltage conversion circuit of the uninterruptible power supply, controlling the charging circuit to charge the battery, controlling the first voltage conversion circuit to perform an AC-DC conversion operation, controlling the second voltage conversion circuit to perform a DC-AC conversion operation, wherein an input terminal of the second voltage conversion circuit is electrically coupled to an output terminal of the first voltage conversion circuit.

24. The battery activation operation method of claim 22, wherein the sensing circuit is further electrically coupled to at least one of the AC power source, the bypass path and an output terminal of the uninterruptible power supply, and the battery activation operation method further comprises the step of:

when it is determined that the battery has not discharged to the predetermined level, having the uninterruptible power supply sense, by the sensing circuit, at least one of the power supplied by the AC power source, the power transmitted by the bypass path, and the power supplied by the output terminal of the uninterruptible power supply, so as to determine whether there is abnormal power.

25. The battery activation operation method of claim 24, further comprising:

having the uninterruptible power supply further determine whether to enter a line mode according to the power characteristics of the AC power source when it is determined that there is abnormal power.

26. The battery activation operation method of claim 25, further comprising:

having the uninterruptible power supply perform the following operations when it determines to enter the line mode: changing the operation of the uninterruptible power supply to provide the received AC power to the first voltage conversion circuit, stopping providing the output of the battery to the first voltage conversion circuit, changing the operation of the uninterruptible power supply to electrically couple the output terminal of the uninterruptible power supply to an output terminal of a second voltage conversion circuit of the uninterruptible power supply, controlling the charging circuit to charge the battery, controlling the first voltage conversion circuit to perform an AC-DC conversion operation, controlling the second voltage conversion circuit to perform a DC-AC conversion operation, wherein an input terminal of the second voltage conversion circuit is electrically coupled to an output terminal of the first voltage conversion circuit.

27. The battery activation operation method of claim 25, further comprising:

having the uninterruptible power supply change the operation of the uninterruptible power supply to electrically couple the output terminal of the uninterruptible power supply to an output terminal of a second voltage conversion circuit of the uninterruptible power supply when it determines not to enter the line mode.

28. The battery activation operation method of claim 25, wherein the power characteristics of the AC power source comprise at least one of a voltage range and a frequency range.

29. The battery activation operation method of claim 21, further comprising:

having the uninterruptible power supply control a second voltage conversion circuit of the uninterruptible power supply to perform a DC-AC conversion operation, wherein an input terminal of the second voltage conversion circuit is electrically coupled to an output terminal of the first voltage conversion circuit.

30. The battery activation operation method of claim 29, further comprising:

having the uninterruptible power supply sense the residual power of the battery through a sensing circuit, and accordingly determine whether the battery has discharged to a predetermined level.

31. The battery activation operation method of claim 30, further comprising:

having the uninterruptible power supply perform the following operations when the determination result is yes: changing the operation of the uninterruptible power supply to provide the received AC power to the first voltage conversion circuit, stopping providing the output of the battery to the first voltage conversion circuit, changing the operation of the uninterruptible power supply to electrically couple the output terminal of the uninterruptible power supply to an output terminal of the second voltage conversion circuit, controlling the charging circuit to charge the battery, controlling the first voltage conversion circuit to perform an AC-DC conversion operation, controlling the second voltage conversion circuit to perform the DC-AC conversion operation.

32. The battery activation operation method of claim 30, wherein the sensing circuit is further electrically coupled to at least one of the AC power source, the bypass path and an output terminal of the uninterruptible power supply, and the battery activation operation method further comprises the step of:

when it is determined that the battery has not discharged to the predetermined level, having the uninterruptible power supply sense, by the sensing circuit, at least one of the power supplied by the AC power source, the power transmitted by the bypass path, and the power supplied by the output terminal of the uninterruptible power supply, so as to determine whether there is abnormal power.

33. The battery activation operation method of claim 32, further comprising:
having the uninterruptible power supply further determine whether to enter a line mode according to the power characteristics of the AC power source when it is determined that there is abnormal power.

34. The battery activation operation method of claim 33, further comprising:
having the uninterruptible power supply perform the following operations when it determines to enter the line mode: changing the operation of the uninterruptible power supply to provide the received AC power to the first voltage conversion circuit, stopping providing the output of the battery to the first voltage conversion circuit, changing the operation of the uninterruptible power supply to electrically couple the output terminal of the uninterruptible power supply to an output terminal of the second voltage conversion circuit, controlling the charging circuit to charge the battery, controlling the first voltage conversion circuit to perform an AC-DC conversion operation, and controlling the second voltage conversion circuit to perform the DC-AC conversion operation.

35. The battery activation operation method of claim 33, further comprising:
having the uninterruptible power supply change the operation of the uninterruptible power supply to electrically couple the output terminal of the uninterruptible power supply to an output terminal of the second voltage conversion circuit when it determines not to enter the line mode.

36. The battery activation operation method of claim 33, wherein the power characteristics of the AC power source comprise at least one of a voltage range and a frequency range.

37. The battery activation operation method of claim 21, wherein the uninterruptible power supply further determines whether to perform the battery activation operation based on at least one of the following conditions: whether the battery has been used for a predetermined period of time, whether the number of discharges of the battery has reached a predetermined number, whether the discharge time of the battery has decreased by a predetermined ratio, and whether a trigger signal for the battery activation operation has been received.

\* \* \* \* \*